Feb. 17, 1925.  1,526,452
H. W. ALDEN
AIR CONTROL DEVICE FOR VEHICLE BRAKES
Filed April 9, 1924
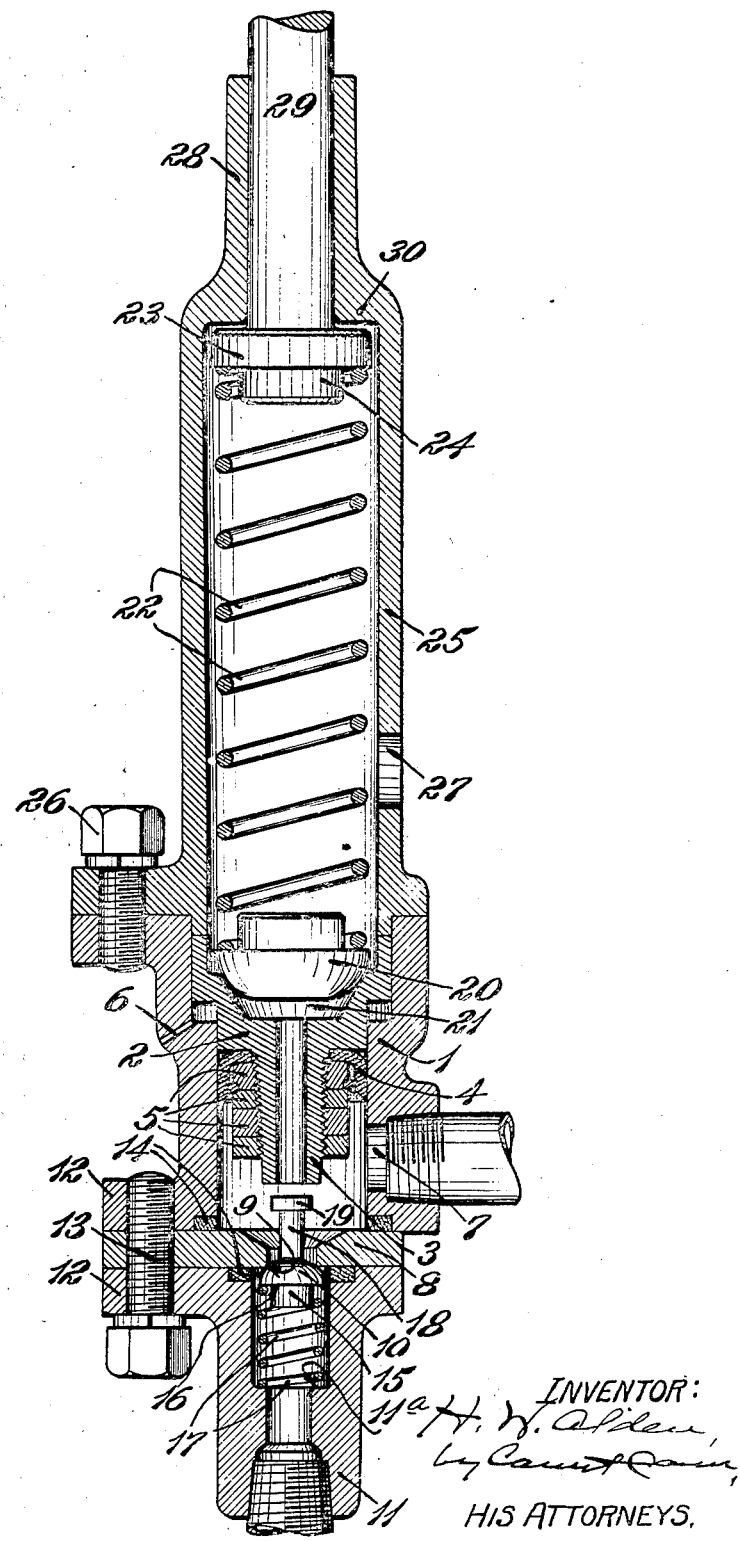
INVENTOR:
H. W. Alden,
HIS ATTORNEYS.

UNITED STATES PATENT OFFICE.

HERBERT W. ALDEN, OF DETROIT, MICHIGAN, ASSIGNOR TO THE TIMKEN-DETROIT AXLE COMPANY, OF DETROIT, MICHIGAN, A CORPORATION OF MICHIGAN.

AIR-CONTROL DEVICE FOR VEHICLE BRAKES.

Application filed April 9, 1924. Serial No. 705,191.

*To all whom it may concern:*

Be it known that I, HERBERT W. ALDEN, a citizen of the United States, and a resident of the city of Detroit, in the county of Wayne and State of Michigan, have invented a new and useful Improvement in Air-Control Devices for Vehicle Brakes, of which the following is a specification.

My invention relates to devices for use with vehicle air brakes and the like for controlling the admission and release of compressed air; and has for its principal object to enable the operator to not only apply and release the brakes but to vary the operating and release pressures at will. It consists principally in using a pressure-responsive exhaust valve and providing that its resisting power may be varied at will by suitable movement of a member under the control of the operator. It also consists in the construction and arrangement of parts hereinafter described and claimed.

The accompanying drawing, which constitutes a part of this specification, is a longitudinal sectional view of my device, with the innermost parts shown in elevation.

My device comprises a hollow body member or cylinder 1 which is open at both ends. At one end, the cylinder is enlarged or counterbored concentric with the bore through the middle portion thereof. In the cylinder is located a piston 2 of two diameters, one of which has a working fit with the bore of the middle portion of the cylinder and the other has a working fit in the enlarged or counterbored portion of the cylinder. This piston is made in the form of a hollow shell and has a tubular extension 3 projecting axially inwardly from the portion of smaller diameter. Mounted on this tubular extension is a flexible washer 4 or other suitable packing which contacts with the inner surface of the smaller bore of the cylinder to form an airtight joint therewith. This washer or packing is clamped in place by suitable lock nuts 5 or devices that work on threads provided therefor on the outer surface of the axial extension of the piston. A relief port or passageway 6 extends through the wall of the cylinder into the larger bore thereof at or close to the annular shoulder at the end of the enlarged bore. A port or passageway 7 which communicates with the brake actuating devices, extends through the wall of the cylinder into the smaller bore thereof in such location that it is never closed.

One end of the cylinder is closed by a plate 8 which has a central bore whose edge constitutes the seat 9 for an inlet valve 10. This valve is located in a hollow inlet member 11 which communicates with a suitable source of compressed air or other fluid pressure. The inlet member and the end portion of the cylinder are provided with ears or flanges 12 and these parts are securely clamped together by means of cap screws 13 or the like which extend through alined openings in said ears or flanges and the intervening seat plate 8. In order to make the joints airtight, the end of the cylinder and the end of the valve inlet member adjacent to the valve seat plate are counterbored and provided with suitable packing 14 which bears against the valve seat plate. It is noted that the valve seat plate is of very simple and inexpensive construction and may be readily removed and replaced.

The operating surface of the inlet valve 10 is of spherical form with a larger diameter that is greater than the bore of the valve seat and a smaller diameter that is less than the diameter of said bore. An axial extension or boss 15 of reduced diameter extends outwardly from the valve, thus forming an annular shoulder 16 against which bears one end of a helical compression spring 17, whose other end bears against an annular shoulder 11ª formed therefor in the inlet member. By this arrangement, the spring 17, together with the pressure of the air from the source of supply tends to hold the spherical portion of the valve 10 in closed position against the edge 9 of the plate. which edge constitutes the seat for said valve.

Said inlet valve has a stem 18 that extends through the valve seat plate into the chamber of the cylinder and terminates in an enlarged head 19 in axial alinement with the bore of the piston. This head is of greater diameter than the bore of said piston and in position to be pushed thereby. In the normal position of the parts, the inlet valve 10 is seated and shuts off the supply of compressed air. In this position, there is normally a slight space intervening between the head 19 of said valve stem, and the end of the extension 3 of the piston; but the space is so slight that the piston can move for enough for its axial extension to bear against said head and lift the inlet valve off of its seat against the force of its spring, thereby admitting compressed air into the cylinder and thence through the continuously open outlet 7 to the brake actuating devices.

The exhaust valve 20 has a spherical surface which is adapted to bear against a seat 21 provided therefor in the shell-like piston. For this purpose, the larger end of the piston is counterbored to form a shoulder, whose edge constitutes the seat for the exhaust valve. The exhaust valve is normally held against its seat by means of a helical compression spring 22, one end of which bears against the back of said valve and the other end of which bears against the head or shoulder 23 of a plunger 24 that is subject to manipulation or control by the operator. The spring 22 and said head 23 are encased in a tubular housing 25 which is clamped by cap screws 26 or the like to the end of the cylinder 1; and this housing is provided with an exhaust port 27 in its side. The housing is large enough to encase the head of the plunger but is reduced in diameter beyond said head to serve as a guide 28 for the stem 29 of said plunger 24. The offset 30 formed by reducing the diameter of said housing constitutes a shoulder or abutment that limits the outward movement of the head of the plunger.

The operation of my device is as follows: In the normal position of the parts, the inlet valve 10 is held against its seat by the spring 17; the exhaust valve 20 is held against its seat by the spring 22; and the extension 3 of the piston 2 is spaced slightly from the head of the inlet valve. When the operator, directly or through the instrumentality of any suitable connecting devices, transmits motion to the actuating plunger 24, the pressure on said plunger is transmitted through the helical spring 22 and the exhaust valve 20 to the piston 2 so as to cause movement of such piston. This movement of the piston causes its inward extension 3 to bear against the head 19 of the inlet valve and thereby lift said valve off of its seat against the pressure of its spring 17 and thereby admit compressed air to the cylinder and thence to the brake actuating devices. When the pressure on the plunger 24 is released, the spring 22 forces it outwardly, and the pressure of the air in the cylinder forces the piston 2 to its normal position, and the excess pressure lifts the exhaust valve 20 off of its seat and is relieved through the exhaust port 27.

It is noted that the only thing that holds the exhaust valve 20 on its seat is the helical compression spring 22, and that the air is released from the cylinder as soon as the air pressure on said exhaust valve exceeds the pressure of said helical spring. Thus, any variation in the pressure of the spring will vary the pressure at which the exhaust valve opens; and the plunger 24, which is under the control of the operator, furnishes a very simple and effective means of varying the spring pressure and consequently the pressure at which the exhaust valve opens. If the plunger is moved only a slight distance into the housing, it only slightly increases the pressure of the spring; and likewise the further the plunger is forced into the housing, the greater becomes the pressure of said spring and consequently the pressure at which the release valve will open. Thus the pressure may be very rapidly and efficiently controlled by the operator.

What I claim is:

1. A valve control device for vehicle air brakes which comprises a cylinder which communicates with an air brake, an air inlet valve for controlling the admission of air into said cylinder, a piston slidable in said cylinder, an exhaust valve in said piston responsive to the air pressure in said cylinder, and means under the control of the operator for varying the power of said exhaust valve to resist such pressure.

2. A valve control device for vehicle air brakes which comprises a cylinder having a port for communicating with the brake actuating devices, a valve for admitting air into said cylinder, a hollow piston slidable in said cylinder, an air pressure operated exhaust valve in said piston, and means under the control of the operator for varying the power of said exhaust valve to resist such pressure.

3. A valve control device for vehicle air brakes which comprises a cylinder having a port for communicating with the brake actuating devices, an air inlet valve for said cylinder, a hollow piston slidable in said cylinder, a spring pressed exhaust valve in said piston operable against the force of said spring by the air pressure in said cylinder, and means under the control of the operator for varying the pressure of said spring.

4. A valve control device for vehicle air brakes which comprises a cylinder which communicates with the air brakes, a piston slidable in said cylinder, a reciprocatable inlet valve for said cylinder in position to be actuated by said piston, an exhaust valve in said piston responsive to the air pressure in said cylinder, and means under the control of the operator for varying the pressure on said exhaust valve.

5. A valve control device for vehicle air brakes which comprises a cylinder that communicates with the air brake, a piston slidable in said cylinder, a reciprocatable inlet valve for said cylinder in position to be actuated by said piston, a variable resistance exhaust valve for said cylinder responsive to the pressure therein, and means under the control of the operator for actuating said piston to open the inlet valve and adjust the resistance of said exhaust valve.

6. A valve control device for vehicle air brakes which comprises a cylinder that communicates with the air brake, a piston slidable in said cylinder, a spring-pressed inlet valve for said cylinder in position to be actuated by said piston, an exhaust valve in said piston responsive to the pressure in said cylinder, a plunger under the control of the operator, and a spring interposed between said exhaust valve and said plunger, whereby the movement of said plunger causes the opening of the inlet valve and a variation of the resisting power of the exhaust valve proportionate to the extent of movement of such plunger.

7. A valve control device for vehicle air brakes which comprises a chamber having a port for communicating with the brake actuating devices, an air inlet valve for said chamber, a member in said chamber movable by the operator at will to open said inlet valve, a spring pressed exhaust valve in said member operable against the force of said spring by the air pressure in said chamber, and means under the control of the operator for varying the pressure of said spring.

Signed at Detroit, Michigan, this 28th day of March, 1924.

HERBERT W. ALDEN.